United States Patent
Abner et al.

(10) Patent No.: US 10,368,537 B2
(45) Date of Patent: Aug. 6, 2019

(54) GUIDE SYSTEM FOR BREAKAWAY CABLES OF AGRICULTURAL SPRAYER BOOMS

(71) Applicant: CNH Industrial America LLC, New Holland, PA (US)

(72) Inventors: Jade Abner, Benson, MN (US); John Paul Honermann, Benson, MN (US)

(73) Assignee: CNH Industrial America LLC, New Holland, PA (US)

(*) Notice: Subject to any disclaimer, the term of this patent is extended or adjusted under 35 U.S.C. 154(b) by 333 days.

(21) Appl. No.: 14/995,669

(22) Filed: Jan. 14, 2016

(65) Prior Publication Data

US 2017/0202129 A1  Jul. 20, 2017

(51) Int. Cl.
*A01C 23/00* (2006.01)
*A01M 7/00* (2006.01)

(52) U.S. Cl.
CPC ......... *A01M 7/0078* (2013.01); *A01C 23/008* (2013.01)

(58) Field of Classification Search
CPC .............. Y10T 403/11; Y10T 403/16; Y10T 403/32819; Y10T 403/32852; A01M 7/0078; A01C 23/008; F16P 5/00; F16P 5/005
USPC ............... 254/4 R, 134.5, 134.4; 403/2, 11; 239/159, 161, 166
See application file for complete search history.

(56) References Cited

U.S. PATENT DOCUMENTS

| | | | |
|---|---|---|---|
| 2,822,318 A | | 7/1883 | Hinds |
| 2,602,684 A | * | 7/1952 | Pinke ................. A01M 7/0078 16/281 |
| 2,619,379 A | * | 11/1952 | Skifte ................. A01M 7/0078 239/168 |
| 2,703,222 A | * | 3/1955 | Feucht ................. E21B 7/025 173/193 |
| 2,770,493 A | * | 11/1956 | Fieber ................. A01M 7/00 239/168 |
| 3,395,503 A | * | 8/1968 | Grenburg ............ A01M 7/0075 239/164 |
| 3,506,999 A | | 4/1970 | Neher |

(Continued)

FOREIGN PATENT DOCUMENTS

| | | | |
|---|---|---|---|
| DE | 3914054 | 10/1990 | |
| EP | 0745526 | 12/1996 | |
| SU | 975998 | * 11/1982 | ............... E06B 3/94 |

OTHER PUBLICATIONS

Denisov et al., Derwent English Abstract of SU975998, Derwent-Week: 198339, Thomson Reuters, Derwent-ACC-No. 1983-775434.*

(Continued)

*Primary Examiner* — Chee-Chong Lee
(74) *Attorney, Agent, or Firm* — Rebecca L. Henkel; Rickard K. DeMille

(57) ABSTRACT

A guide system for use with breakaway cables of a sprayer boom of an agricultural sprayer is provided that may include multiple guides for the cables. One of the guides may provide a barrier to physical contact between the cables and the other guide or other potential pinch points to eliminate instances of breakaway cable pinching. This may be done by way of a guide tube through which the cable extends, with the guide tube preventing physical contact between the cable and a pair of rollers of a roller guide.

14 Claims, 4 Drawing Sheets

(56) References Cited

U.S. PATENT DOCUMENTS

| | | | |
|---|---|---|---|
| 3,866,834 A * | 2/1975 | Shannon | A01M 7/0053 |
| | | | 172/509 |
| 4,363,945 A | 12/1982 | Kunczynski | |
| 4,430,023 A | 2/1984 | Hayes et al. | |
| 4,655,379 A | 4/1987 | Busch | |
| 4,768,798 A | 9/1988 | Reed et al. | |
| 5,022,782 A | 6/1991 | Gertz et al. | |
| 5,839,684 A | 11/1998 | Poloni et al. | |
| 5,845,893 A | 12/1998 | Groves | |
| 6,471,191 B1 | 10/2002 | Rotzler et al. | |
| 7,325,508 B2 | 2/2008 | Boatman et al. | |

OTHER PUBLICATIONS

D Series Cable En-trance Protection Roller; Yongkang Jingyuan Machinery Power Co., Ltd., Apr. 8, 2013; 2 pages.
Davis Cable Covers; Davis Instruments; Apr. 8, 2013; 1 page.

\* cited by examiner

GUIDE SYSTEM FOR BREAKAWAY CABLES OF AGRICULTURAL SPRAYER BOOMS

FIELD OF THE INVENTION

The invention relates generally to agricultural product application equipment such as self-propelled agricultural sprayers and, in particular, to a guide system for breakaway cables of an agricultural sprayer boom.

BACKGROUND OF THE INVENTION

Sprayer boom lengths are increasing over time to allow increased coverage in a single spraying pass. Longer boom lengths can lead to relatively more vertical movement of the boom tip ends while the booms flex during use and during tilting or roll movements of the sprayer. This vertical movement can cause the boom tip ends to contact the ground during touchdown events. Touchdown events can also occur when the ground under the tip ends of booms is at a greater height than the ground over which the sprayer wheels are driving. To help protect the booms during touchdown events, some booms have breakaway boom sections at their ends that are supported by breakaway joints. The breakaway joints are configured to absorb impact energy by allowing breakaway boom sections to pivot upwardly and/or rearwardly during touchdown events. Some breakaway boom sections are able to pivot in both forward and rearward directions and are biased toward centered or neutral positions by springs at the breakaway joints. Some breakaway joints have a pair of cables with ends connected to a tension spring. Opposite ends of the cables are connected to ends of a breakaway lever attached to the breakaway boom section. This allows movement of the breakaway boom section in either forward or rearward directions during a touchdown event to further load the tension spring, which restores the breakaway boom section to the neutral position after the touchdown event. The cables are routed through a roller guide that has a pair of rollers held between a pair of plates. The rollers guide the cables so that the cables pull the tension spring in a generally straight line regardless of the position of the breakaway boom section. However, during particularly forceful touchdown events, the cables may whip or jerk and move toward ends of the rollers. Over time, some cables start to track toward the ends of the rollers. Eventually, the cables can work their way off the ends of the rollers and get stuck in or damaged by being pulled through a narrow gap between the rollers and the plates of the roller guide. When the cables get stuck, the breakaway joint no longer works because movement in at least one direction may be stopped. Cables that are damaged may fail earlier than they would otherwise, which compromises the function of the breakaway joint. Compromised or nonfunctional breakaway joints can lead to damage of boom tip components and other boom components during touchdown events.

SUMMARY OF THE INVENTION

A guide system for use with breakaway cables of a sprayer boom of an agricultural sprayer is provided that allows for a breakaway joint with straightforward construction and trouble-free breakaway cable operation. The guide system may include multiple guides, with one of the guides providing a barrier to physical contact between a cable and the other guide or other potential pinch points to eliminate instances of breakaway cable pinching. This may be done by way of a guide tube through which the cable extends, with the guide tube preventing physical contact between the cable and a pair of rollers.

According to one aspect of the invention, a guide system for use with a breakaway cable of a sprayer boom of an agricultural sprayer is provided. The sprayer boom includes a first boom section and a second boom section defining a breakaway boom section of the sprayer boom with a breakaway joint having a breakaway cable extending between the first boom section and the breakaway boom section for controlling movement of the breakaway boom section with respect to the first boom section. The guide system includes a first guide supported relative to the first boom section and has an interior passage extending generally in alignment with the first boom section. A second guide extends through the interior passage of the first guide. The breakaway cable extends through an interior passage of the second guide, and the second guide is configured to move with respect to the first guide and the first boom section during movement of the breakaway boom section with respect to the first boom section.

According to another aspect of the invention, the first guide is supported in a fixed position relative to the first boom section. The second guide may be configured to slide in a longitudinal direction through the interior passage of the first guide. The cable may be one of a pair of cables that extends between the first boom section and the breakaway boom section and through the second guide.

According to another aspect of the invention, the first guide may be a roller guide that has a pair of spaced apart rollers arranged on opposite sides of the second guide to limit transverse movement of the second guide.

According to another aspect of the invention, the second guide may be a guide tube with a circumferential sidewall extending about an interior passage of the second guide. The guide tube may have first and second ends on opposite sides of the roller guide and the first and second ends of the guide tube may move relative to the rollers of the roller guide while the breakaway boom section moves with respect to the first boom section.

According to another aspect of the invention, a breakaway lever extends from the breakaway boom section with the breakaway lever and has a first lever end arranged beyond a first side of the breakaway boom section and a second lever end arranged beyond a second side of the breakaway boom section. The pair of cables is respectively connected to the first and second lever ends. Deflection of the breakaway boom section in a first direction moves the first lever end toward the first boom section, and deflection of the breakaway boom section in a second direction moves the second lever end toward the first boom section. Movement of the breakaway lever causes movement of the guide tube with respect to the rollers of the roller guide, which may include pulling the guide tube relatively farther through the roller guide.

According to another aspect of the invention, a spring is supported by the first boom section for biasing the breakaway boom section to a neutral position. The guide tube may be aligned with the spring and the pair of cables may be connected to the spring at an outer end of the guide tube. The outer end of the guide tube may face toward the spring and may be attached to the spring. The ends of the pair of cables and the outer end of the guide tube may move in unison with each other.

According to another aspect of the invention, the guide system may include an anchor at the inner end of the guide tube. The ends of the pair of cables and the spring may be attached to the anchor. The anchor may be a fastener such as a bolt or a pin that extends in a transverse direction through the outer end of the guide tube.

According to another aspect of the invention, the guide tube may have an inner end opposite the outer end. The outer end of the guide tube may have an opening that is wider than the interior passage of the guide tube. The inner end of the guide tube may taper toward a main body section of the guide tube.

According to another aspect of the invention, a guide system is provided for use with breakaway cables of a sprayer boom of an agricultural sprayer. The sprayer boom may include a first boom section and a breakaway boom section arranged outwardly of and configured for relative movement with respect to the first boom section. A breakaway lever may be supported by and extend beyond opposite sides of the breakaway boom section. A pair of breakaway cables may connect the breakaway lever to a spring that biases the breakaway boom section to a neutral position relative to the first boom section while permitting deflection of the breakaway boom section relative to the first boom section during breakaway events. A roller guide may be arranged between the spring and the breakaway lever and provide a roller guide interior passage that is aligned with the spring. A guide tube may extend through the roller guide interior passage. The guide tube may have a sidewall that extends about a periphery of a guide tube bore through which the pair of breakaway cables extends. The guide tube is configured to move with respect to the roller guide and in unison with the pair of breakaway cables during movement of the breakaway boom section relative to the first boom section while moving between neutral and deflected positions of the breakaway boom section.

According to another aspect of the invention, the roller guide may have a pair of spaced apart rollers arranged on opposite sides of the guide tube to engage the sidewall of the guide tube to direct the guide tube into substantially longitudinal movement.

According to another aspect of the invention, an agricultural sprayer is provided with a chassis having wheels supporting the agricultural sprayer. A spray system may be supported by the chassis and may include at least one storage container storing a volume of product for spray delivery on to an agricultural field. A boom may extend from the chassis and support nozzles for delivering the product onto the agricultural field. The boom may include a first boom section arranged relatively closer to the chassis. A breakaway boom section may be arranged relatively farther from the chassis. The breakaway boom section may define a neutral position with the breakaway boom section extending generally longitudinally from the first boom section during normal operation and a breakaway position corresponding to the breakaway boom section being deflected away from the neutral position during breakaway events during which the breakaway boom section contacts the ground. A breakaway joint may be arranged between the first boom section and the breakaway boom section and be configured to permit the breakaway boom section to move with respect to the first boom section during breakaway events and bias the breakaway boom section back to the neutral position after breakaway events. The breakaway joint may include a breakaway lever that extends from the breakaway boom section with the breakaway lever having a first lever end arranged beyond a first side of the breakaway boom section and a second lever end arranged beyond a second side of the breakaway boom section. A spring may be supported by the first boom section for biasing the breakaway boom section to the neutral position. A first breakaway cable may be connected to the spring and its outer end may be connected to the first end of the breakaway lever. A second breakaway cable may be connected to the spring and its outer end may be connected to the second end of the breakaway lever. A roller guide may be arranged between the spring and the breakaway lever and define a path along which the first and second breakaway cables extend from the first and second ends of the breakaway lever to the spring. A guide tube may be movably arranged within the roller guide and have a circumferential sidewall and a guide tube bore extending longitudinally through the guide tube inwardly of the circumferential sidewall. The guide tube may define a spring end facing the spring and be arranged for movement in unison with the spring and a lever end facing the breakaway lever and have a guide tube lever end opening that extends into the guide tube bore and receives the first and second breakaway cables. The first and second breakaway cables may extend angularly from the first and second ends of the breakaway lever into the guide tube lever end opening and through the guide tube bore. The guide tube may provide a barrier between the first and second breakaway cables and the roller guide.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
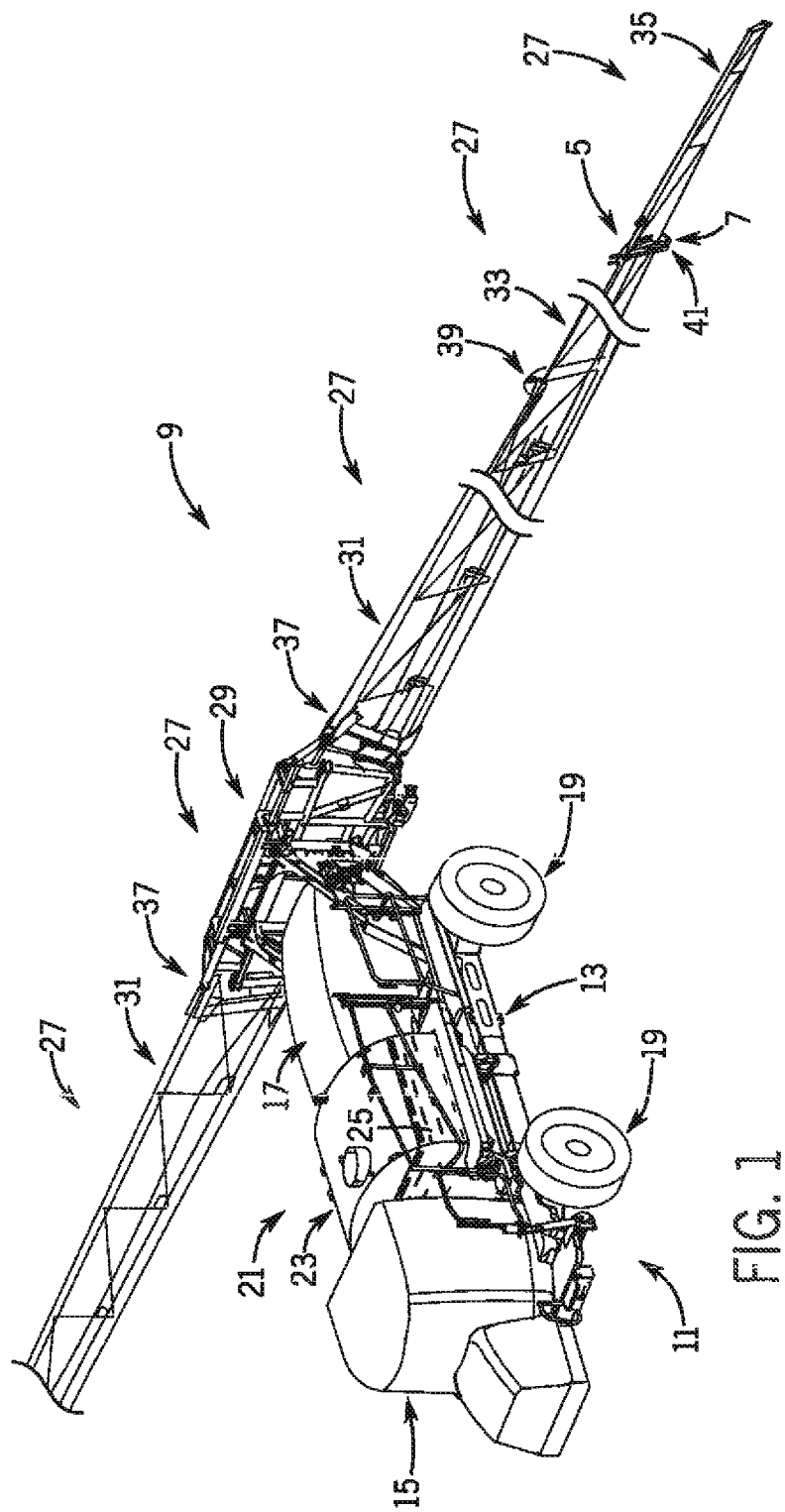
FIG. 1 is a pictorial view of an agricultural sprayer with a guide system for breakaway boom cables according to the present invention.

Referring now to the drawings and specifically to FIG. 1, a guide system 5 for guiding breakaway cables of a breakaway joint 7 of a boom 9 is shown that reduces the likelihood of breakaway cable damage and helps prevent damage to boom tip components. Guide system 5 and boom 9 are shown incorporated on an agricultural sprayer. The agricultural sprayer is shown here as a self-propelled agricultural sprayer vehicle or self-propelled sprayer 11, which is shown here as a rear-mounted boom self-propelled sprayer, although it is understood that self-propelled versions of sprayer 11 can have either rear-mounted or front-mounted booms. Sprayer 11 may include those available from CNH Industrial, including the Case IH Patriot Series sprayers.

Still referring to FIG. 1, sprayer 11 has a chassis that includes frame 13 that supports various assemblies, systems, and components. These various assemblies, systems, and components include cab 15, engine 17, and a hydraulic system that receives power from engine 17 and includes at least one hydraulic pump which may be in a hydrostat arrangement for providing hydraulic pressure for operating hydraulic components within the hydraulic system. For sprayers 11 with hydrostatic drives, hydraulic motors are operably connected to the hydraulic pump(s) for rotating wheels 19. In mechanical drive applications, a mechanical transmission receives power from engine 17 and delivers power for rotating wheels 19 by way of power-transmitting driveline components, such as drive shafts, differentials, and other gear sets in portal, drop boxes, or other housings. Spray system 21 includes storage containers such as product tank 23 that stores a volume of product 25 for delivery onto an agricultural field with sprayer 11. Product 25 includes any of a variety of agricultural liquid products, such as various pesticides, herbicides, fungicides, liquid fertilizers, and other liquids including liquid suspensions beneficial for application onto agricultural fields. A product delivery pump conveys product 25 from product tank 23 through plumbing components such as interconnected pieces of tubing and through a boom tubing system for release out of spray nozzles that are spaced from each another along the width of boom 9 during spraying operations of sprayer 11.

Still referring to FIG. 1, boom 9 includes multiple boom sections 27 connected longitudinally to provide the corresponding width of the assembled boom 9. Boom sections 27 include center section 29 and left and right boom arms extending in opposite directions from center section 29. Left and right boom arms have multiple sections with pairs of inner boom sections 31, mid boom sections 33, and outer or breakaway boom sections 35 extending in opposite directions along the respective left and right boom arms mirrored about a longitudinal axis of the sprayer 11. The corresponding left and right sections of the pairs of inner, mid, and breakaway boom sections 31, 33, 35 are substantially identical, so only one will be described, with the description applying to both the left and right sections of left and right boom arms. At each of the left and right boom arms, an inner end of inner boom section 31 is pivot-connected with hinge 37 to center section 29 and an outer end is pivot-connected with hinge 39 to an inner end of mid boom section 33. Breakaway joint 7 includes at least one hinge 41 that interconnects an outer end of mid boom section 33 to an inner end of breakaway boom section 35. The hinges 37, 39 and breakaway joint 7 between the respective inner, mid, and breakaway boom sections 31, 33, 35 allow the boom 9 to collapse by folding into a non-use or stored folded position for transportation. Although boom 9 is shown with three sections at each of the left and right boom arms that can fold generally horizontally, the number of sections and the direction of folding can be different such as a single section or two sections and a generally vertical folding direction to collapse the boom 9 into the stored folded position.

Figure 2:
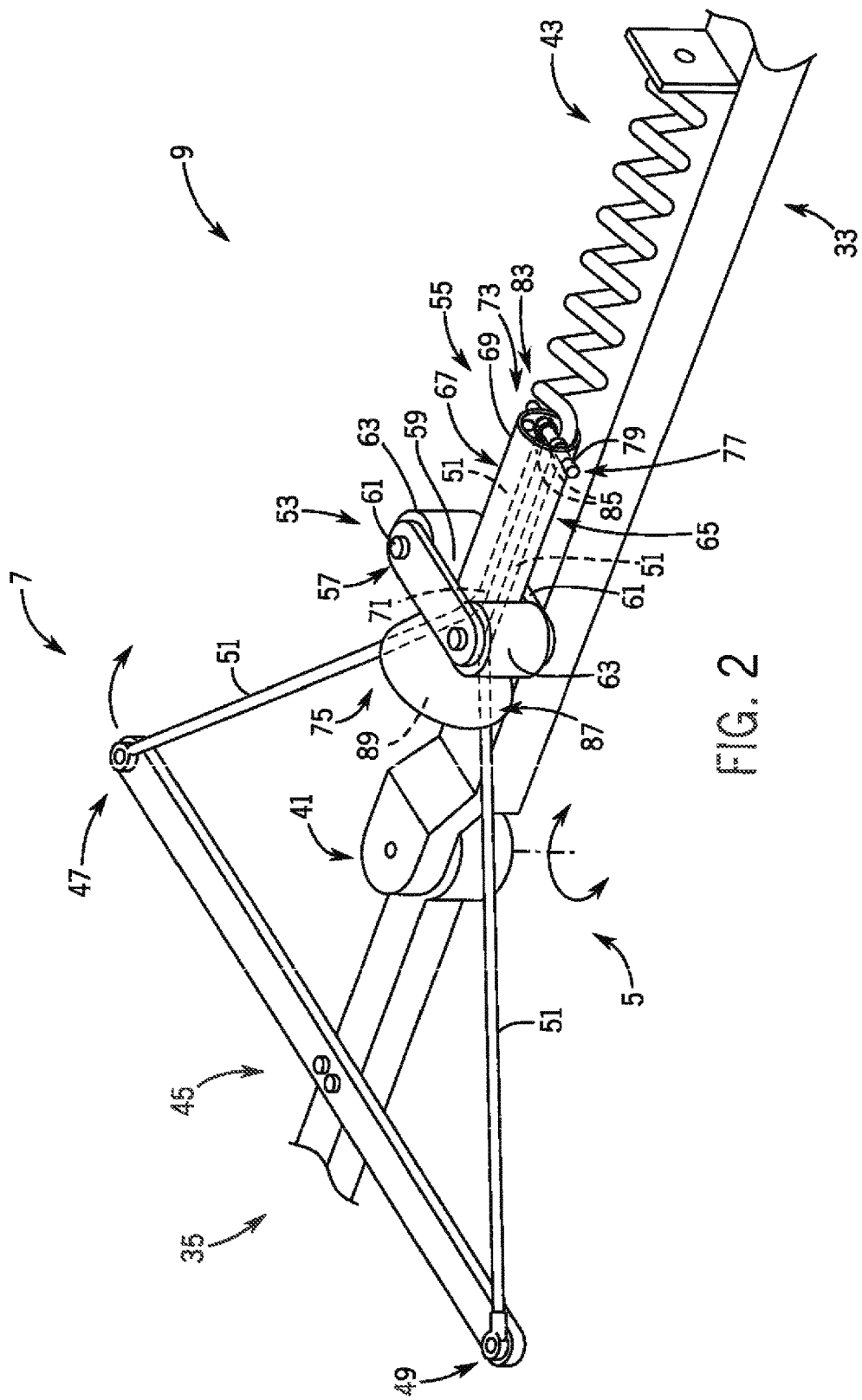
FIG. 2 is a simplified enlarged pictorial view of a breakaway joint of the agricultural sprayer of FIG. 1.

Referring now to FIGS. 1 and 2, breakaway joint 7 is configured to absorb impact energy by allowing breakaway boom section 35 to deflect during touchdown events during which the boom section 35 touches the ground or other obstacle. During deflection, the breakaway boom section 35 moves through articulation of the breakaway joint 7 away from a neutral position (FIGS. 1 and 3) in which the breakaway boom section 35 extends straight outwardly from the rest of the boom 9 to a breakaway position in which the breakaway boom section 35 extends at an angle with respect to the rest of the boom 9 (FIG. 4). Hinge(s) 41 of the breakaway joint 7 is arranged with respect to the breakaway boom section 35 to allow the breakaway boom section 35 to move relative to the rest of the boom 9 such as to pivot vertically or horizontally. Hinge(s) 41 defines a pivot axis that may be arranged tilted away from vertical so that deflection moves the breakaway boom section 35 with both a horizontal and vertical component, such as both rearwardly and upwardly.

Referring to the simplified representation of the components in FIG. 2, breakaway joint 7 includes spring 43 and breakaway lever 45 arranged at opposite sides of hinge 41. Spring 43 is shown arranged inwardly of the hinge 41, connected to mid boom section 33. Breakaway lever 45 is shown arranged outwardly of hinge 41, connected to breakaway boom section 35. Breakaway lever 45 includes first lever end 47 arranged beyond a first side of the breakaway boom section 35, shown in front of breakaway boom section 35. A second lever end 49 is arranged beyond a second side of the breakaway boom section 35, shown behind the breakaway boom section 35. At least one cable 51 connects spring 43 to breakaway lever 45 so that movement of breakaway boom section 35 is translated through cable 51 to pull against spring 43 when breakaway boom section 35 deflects during touchdown events. As shown, a pair of cables 51 connects spring 43 to the first and second lever ends 47, 49 of breakaway lever 45 to translate movement of breakaway boom section 35 into loading of spring 43 during deflection. The loaded spring 43 biases breakaway boom section 35 back to the neutral position after the deflection or touchdown event by pulling against the cables 51 with a restorative force.

Still referring to FIG. 2, guide system 5 contains and directs movement of at least portions of the cable(s) 51 so that the cable(s) 51 actuates spring 43 along a substantially straight-line path regardless of movement characteristics of breakaway boom section 35. Guide system 5 includes multiple guides, shown as guides 53, 55. Guide 53 is a first or outer guide 53 that is supported in a fixed position relative to the boom 9, such as mounted to mid boom section 33. Guide 55 is a second or inner guide 55 that is configured to cover at least portions of the cable(s) 51 and move with respect to guide 53 to provide a barrier to direct contact between cable(s) 51 and outer guide 53, which prevents binding between cable(s) 51 and outer guide 53.

Still referring to FIG. 2, outer guide 53 defines a roller guide 57 with a central opening or interior passage, shown as roller guide interior passage 59, that is aligned with and faces spring 43. Roller guide 57 has a pair of horizontally arranged brackets 61 and a pair of vertically arranged spaced-apart rollers 63 that collectively extend around roller guide interior passage 59. Rollers 63 are supported by the brackets 61, with a lower bracket 61 connected to the mid boom section 33 so that the roller guide 57 extends upwardly from the mid boom section 33.

Still referring to FIG. 2, inner guide 55 defines a guide tube 65 that has a main body 67 with a sidewall such as circumferential sidewall 69 that extends around a central opening or interior passage of guide tube 65, shown as guide tube bore 71. Guide tube 65 has a first or inner end shown as spring end 73 that faces spring 43 and a second or outer end shown as bracket end 75 that faces breakaway lever 45. Anchor 77 is arranged at the inner or spring end 73 of guide tube 65 and is configured to connect guide tube 65 to spring 43. Anchor 77 is shown having fastener 79 such as a bolt or pin that extends transversely across opposite sides of circumferential sidewall 69, through guide tube bore 71 at the spring end 73 of guide tube 65. Fastener 79 provides a common mounting structure for connecting a hook segment at an outer end 83 of spring 43 and cable ends 85 of cables 51 that may include cable thimbles or eye-type cable end hardware, locking the spring 43, cables 51, and guide tube 65 to each other. In this way, the tube 65 is a rigid sheath that surrounds portions of cables 51 and moves in unison with spring 43 and cables 51. Outer or bracket end 75 of guide tube 65 defines a conical or taper segment 87 that tapers down toward the main body 67. Taper segment 87 provides an opening 89 that is wider than the interior passage or guide tube bore 71 of guide tube 65 and through which the cables 51 extend into guide tube 65. Taper segment 87 provides a frusto-conical lip that tapers in the same direction and approximately the same amount as an angle defined between the cables 51 as the cables 51 converge from the first and second lever ends 47, 49 of breakaway lever 45 toward guide tube 65.

Still referring to FIG. 2, inner guide 55 extends through the interior passage of outer guide 53 by way of guide tube 65 extending through roller guide interior passage 59 of roller guide 57. The inner and outer or spring and bracket ends 73, 75 of guide tube 65 are arranged on opposite sides of the roller guide 57. Rollers 63 of roller guide 57 limit transverse movement of guide tube 65 by engaging the sidewall 69 while permitting longitudinal movement of the guide tube 65 through the roller guide 57. The substantially longitudinal movement of guide tube 65 coincides with lengthening and shortening of spring 43 during loading and unloading of spring 43, which occurs during touchdown or breakaway-type deflection events of breakaway boom section 35 and the corresponding recovery of breakaway boom section 35 to the neutral position.

Figure 3:
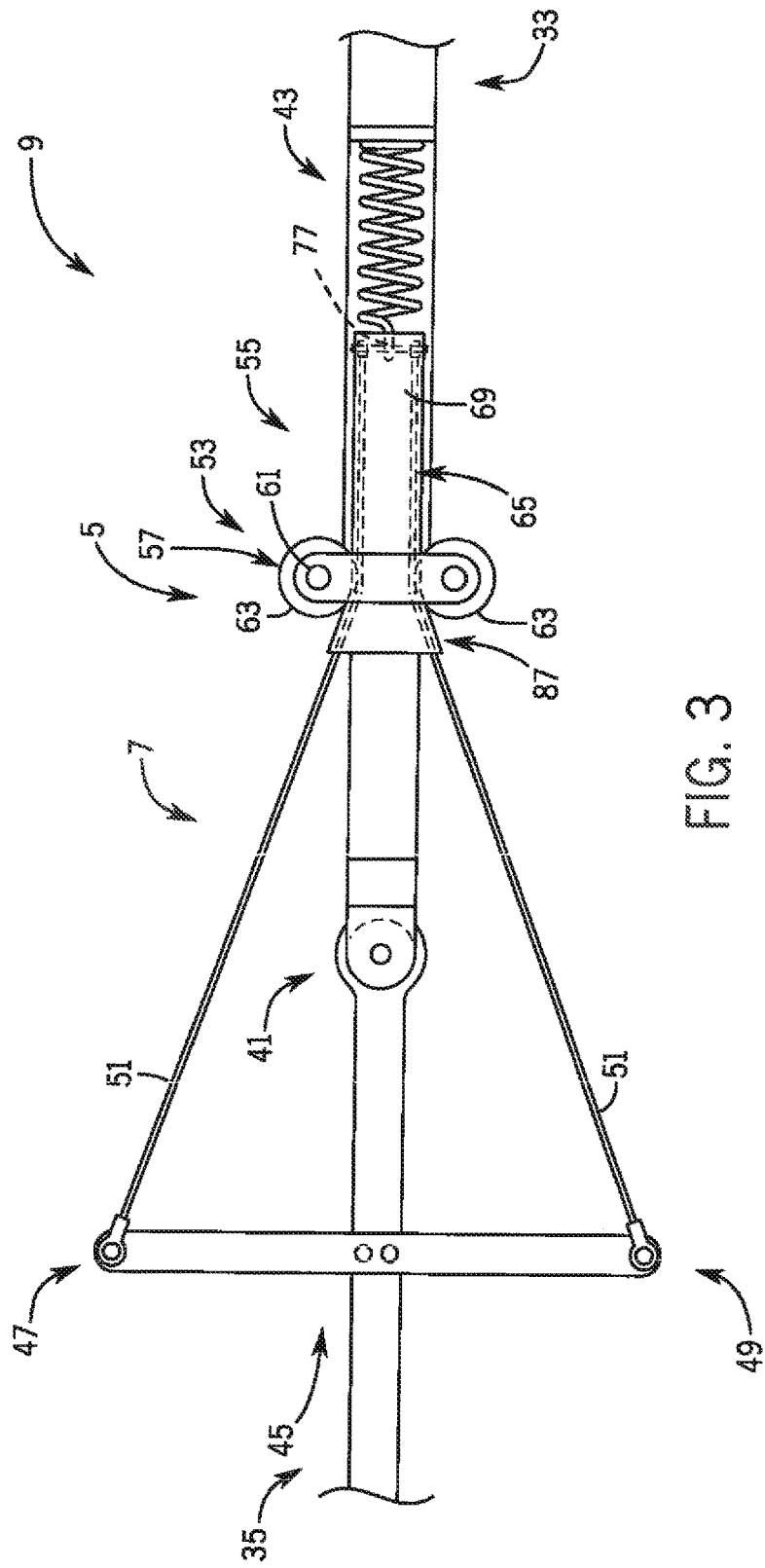
FIG. 3 is simplified partially schematic view of the breakaway joint of FIG. 2 in a neutral position.
Figure 4:
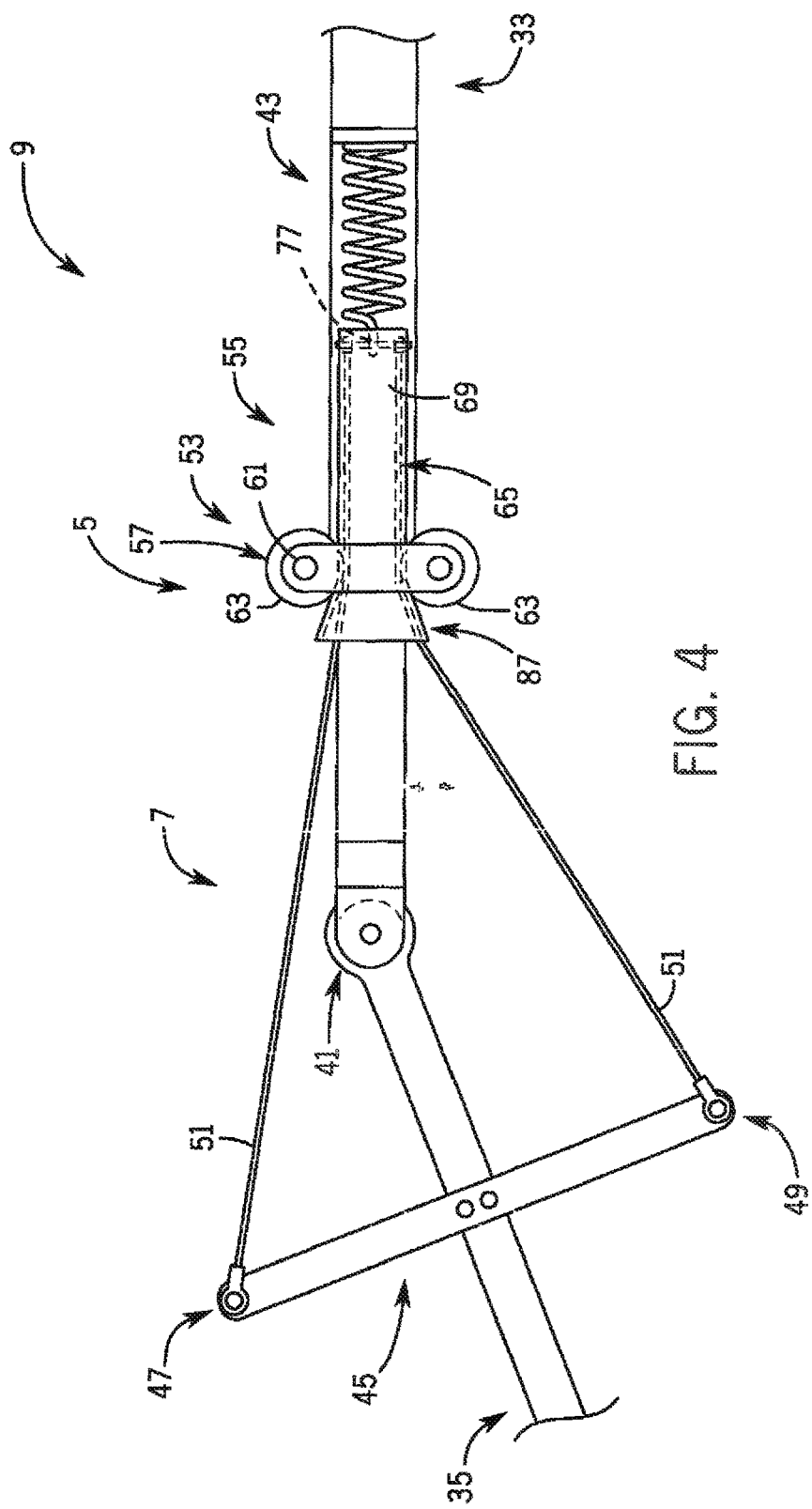
FIG. 4 is simplified partially schematic view of the breakaway joint of FIG. 2 in a deflected position.

Referring now to FIGS. 3 and 4, in light of the above, regardless of the position of breakaway boom section 35 and, thus, the amount of articulation at breakaway joint 7, guide tube 65 loosely sheathes the cables 51 and prevents direct contact of cables 51 with the roller guide 57 by providing a floating tubular barrier that moves with spring 43.

Referring now to FIG. 4, during boom touchdown or deflection events, breakaway boom section 35 pivots away from its neutral position through articulation of breakaway joint 7, which swings the breakaway lever 45 along an arcuate path, defined by the axis of hinge 41 of breakaway joint 7. Movement of the first and second lever ends 47, 49 of breakaway lever 45 pulls the cables 51, which further loads and increases the tension in spring 43 by pulling and extending it. Guide tube 65 moves in unison with spring 43, substantially longitudinally through roller guide 57. During touchdown or deflection, the tendency of guide tube 65 depicted about its point of contact with a roller(s) 63 in the roller guide 57 to follow the transverse component of the arcing motion of breakaway lever 45 is mitigated by the resistive force of spring 43 biasing the inner or spring end 73 of guide tube 65 in a substantially straight-line path aligned with mid boom section 33. This may limit pivoting of guide tube 65 about its contact point with the roller(s) 63 in the roller guide 57 to less than about 20 degrees from its neutral position, whereby the cables 51 may pivot over the end edge of taper segment 87 at the outer or bracket end 75 of guide tube 65 while the guide tube 65 slides longitudinally through roller guide 57 in preference to pivoting the guide tube 65 within roller guide 57, while preventing direct contact of cables 51 with roller guide 57.

Many changes and modifications could be made to the invention without departing from the spirit thereof. The scope of these changes will become apparent from the appended claims.

We claim:

1. A guide system for use with a breakaway cable of a sprayer boom of an agricultural sprayer, wherein the sprayer boom includes a first boom section and a second boom section defining a breakaway boom section of the sprayer boom with a breakaway joint having the breakaway cable extending between the first boom section and the breakaway boom section for controlling movement of the breakaway boom section with respect to the first boom section, the guide system comprising:
   a first guide supported relative to the first boom section and having an interior passage extending generally in alignment with first boom section; and
   a second guide extending through the interior passage of the first guide and having a tubular wall including an outer surface engageable with the first guide and an inner surface extending circumferentially about and defining an interior passage, wherein the breakaway cable extends through the interior passage of the second guide and the tubular wall of the second guide is configured to slide longitudinally along the interior passage of the first guide during movement of the breakaway boom section with respect to the first boom section.

2. The guide system of claim 1 wherein the first guide is supported in a fixed position relative to the first boom section.

3. The guide system of claim 1 wherein the cable is one of a pair of cables extending between the first boom section and the breakaway boom section and through the second guide.

4. The guide system of claim 3 wherein the first guide is a roller guide having a pair of spaced-apart rollers arranged on opposite sides of the second guide to limit transverse movement of the second guide.

5. The guide system of claim 4 wherein the tubular wall has first and second ends on opposite sides of the roller guide, and wherein the first and second ends of the tubular wall move relative to the rollers of the roller guide while the breakaway boom section moves with respect to the first boom section.

6. The guide system of claim 4 further comprising a breakaway lever extending from the breakaway boom section with the breakaway lever having a first lever end arranged beyond a first side of the breakaway boom section and a second lever end arranged beyond a second side of the breakaway boom section, wherein the pair of cables are respectively connected to the first and second lever ends and wherein deflection of the breakaway boom section in a first direction moves the first lever end toward the first boom section and deflection of the breakaway boom section in a second direction moves the second lever end toward the first boom section, and wherein movement of the breakaway lever correspondingly moves the guide tube along with respect to the rollers of the roller guide.

7. The guide system of claim 4 further comprising a spring supported by the first boom section for biasing the breakaway boom section to a neutral position.

8. The guide system of claim 7 wherein the tubular wall is aligned with the spring, and the pair of cables connects to the spring at an outer end of the tubular wall.

9. The guide system of claim 8 wherein the outer end of the tubular wall faces toward the spring and is attached to the spring.

10. The guide system of claim 9 wherein ends of the pair of cables and the outer end of the tubular wall move contemporaneously with each other.

11. A guide system for use with a breakaway cable of a sprayer boom of an agricultural sprayer, wherein the sprayer boom includes a first boom section and a second boom section defining a breakaway boom section of the sprayer boom with a breakaway joint having the breakaway cable extending between the first boom section and the breakaway boom section for controlling movement of the breakaway boom section with respect to the first boom section, the guide system comprising:
  a first guide supported relative to the first boom section and having an interior passage extending generally in alignment with first boom section;
  a second guide extending through the interior passage of the first guide with the second guide and having an interior passage, the second guide:
    being a guide tube with a circumferential sidewall extending about respective the interior passage of the second guide; and
    being configured to move with respect to the first guide and the first boom section during movement of the breakaway boom section with respect to the first boom section;
  a spring supported by the first boom section for biasing the breakaway boom section to a neutral position; and
  an anchor at an inner end of the guide tube, and wherein the ends of the pair of cables and the spring are attached to the anchor;
wherein:
  the breakaway cable extends through the interior passage of the second guide;
  the cable is one of a pair of cables extending between the first boom section and the breakaway boom section and through the second guide;
  the first guide is a roller guide having a pair of spaced-apart rollers arranged on opposite sides of the second guide to limit transverse movement of the second guide;
  the guide tube is aligned with the spring, and the pair of cables connects to the spring at an outer end of the guide tube;
  the outer end of the guide tube faces toward the spring and is attached to the spring; and
  ends of the pair of cables and the outer end of the guide tube move contemporaneously with each other.

12. The guide system of claim 11 wherein the anchor comprises a fastener extending transverse direction through the outer end of the guide tube.

13. A guide system for use with a breakaway cable of a sprayer boom of an agricultural sprayer, wherein the sprayer boom includes a first boom section and a second boom section defining a breakaway boom section of the sprayer boom with a breakaway joint having the a breakaway cable extending between the first boom section and the breakaway boom section for controlling movement of the breakaway boom section with respect to the first boom section, the guide system comprising:
  a first guide supported relative to the first boom section and having an interior passage extending generally in alignment with first boom section;
  a second guide extending through the interior passage of the first guide with the second guide and having an interior passage, wherein the breakaway cable extends through the interior passage of the second guide and the second guide is configured to move with respect to the first guide and the first boom section during movement of the breakaway boom section with respect to the first boom section; and
  a spring supported by the first boom section for biasing the breakaway boom section to a neutral position;
wherein:
  the cable is one of a pair of cables extending between the first boom section and the breakaway boom section and through the second guide;
  the first guide is a roller guide having a pair of spaced-apart rollers arranged on opposite sides of the second guide to limit transverse movement of the second guide;
  the second guide is a guide tube with a circumferential sidewall extending about respective the interior passage of the second guide; and
  the guide tube has an inner end opposite an outer end with the outer end of the guide tube having an opening that is wider than the interior passage of the guide tube.

14. The guide system of claim 13 wherein the outer end of the guide tube tapers toward a main body section of the guide tube.

* * * * *